United States Patent
Arechaga et al.

(10) Patent No.: US 6,701,751 B2
(45) Date of Patent: Mar. 9, 2004

(54) GLASS MELTING FURNACE

(75) Inventors: Alfonso Arechaga, Llodio (ES); Jesús María Ugarte, Llodio (ES)

(73) Assignee: Avacon, S.A. (ES)

( * ) Notice: Subject to any disclaimer, the term of this patent is extended or adjusted under 35 U.S.C. 154(b) by 363 days.

(21) Appl. No.: 09/881,185

(22) Filed: Jun. 14, 2001

(65) Prior Publication Data

US 2003/0000250 A1 Jan. 2, 2003

(51) Int. Cl.⁷ .................................................. C03B 5/24
(52) U.S. Cl. ....................................... 65/162; 65/29.21
(58) Field of Search ............................... 65/29.11, 29.21, 65/162

(56) References Cited

U.S. PATENT DOCUMENTS

| | | | | |
|---|---|---|---|---|
| 3,239,324 A | * | 3/1966 | Monks, Jr. | 65/29.21 |
| 3,420,510 A | * | 1/1969 | Griem, Jr. | 432/13 |
| 3,573,016 A | * | 3/1971 | Rees | 65/380 |
| 3,573,017 A | * | 3/1971 | Griem, Jr. | 65/384 |
| 3,915,682 A | * | 10/1975 | Chotin et al. | 65/29.21 |
| 3,954,433 A | * | 5/1976 | Holler | 65/29.21 |
| 4,011,070 A | * | 3/1977 | Hynd | 65/29.17 |
| 4,028,083 A | * | 6/1977 | Patznick et al. | 65/29.21 |
| 4,405,351 A | * | 9/1983 | Sheinkop | 65/29.21 |
| 4,428,686 A | * | 1/1984 | Brax | 374/179 |
| 4,515,614 A | * | 5/1985 | Barkhau et al. | 65/29.21 |
| 4,603,980 A | * | 8/1986 | Berg | 374/179 |
| 4,738,706 A | * | 4/1988 | Picinelli | 65/29.21 |
| 5,194,081 A | | 3/1993 | Trevelyan et al. | 65/29.21 |
| 5,358,541 A | | 10/1994 | Kindall | 65/29.17 |
| 5,693,110 A | | 12/1997 | Iwaihara et al. | 65/29.11 |
| 6,454,562 B1 | | 9/2002 | Joshi et al. | 432/17 |

FOREIGN PATENT DOCUMENTS

JP 57-22122 * 2/1982

* cited by examiner

Primary Examiner—Sean Vincent
(74) Attorney, Agent, or Firm—Muserlian, Lucas & Mercanti

(57) ABSTRACT

Glass melting furnace, of the type consisting of a melting chamber, inside which is found the liquid glass mass, with an outlet, and at least one flue gas recuperative chamber, a means for supplying the influx of fuel, featuring at least one mass temperature gauge immersed in the liquid glass mass and placed approximately at a height ($h_2$) with respect to the bottom of the melting chamber of ⅓ to ⅕ of the height (h) of the level of the liquid glass mass, and ⅕ h ≤ $h_2$ ≤ ⅓ h on the longitudinal axis of the melting chamber at a distance ($l_1$) with respect to the wall of the chamber opposite the outlet, of between 0.6 and 0.85 of the length of the melting chamber 0.6 l ≤ $l_1$ ≤ 0.85 l.

For application in the manufacture of glass containers.

6 Claims, 1 Drawing Sheet

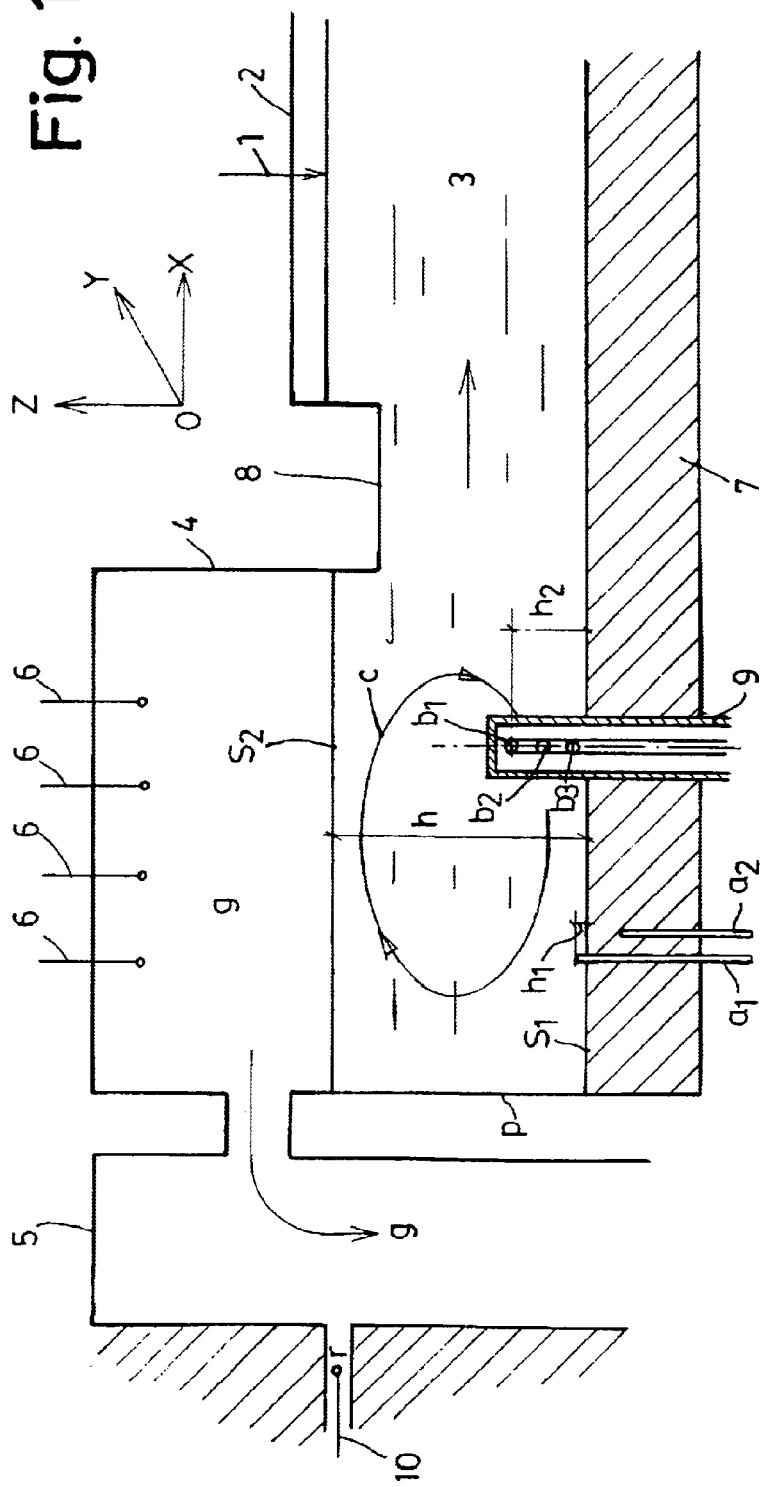

GLASS MELTING FURNACE

In a glass melting furnace the burdens and temperature of the molten mass need to be controlled and regulated.

The control and regulation of the burdens currently in use give acceptable results, but this is not the case with the control and adjustment of the temperatures.

It should be borne in mind that temperatures in a glass furnace are extremely high, usually above 1,300° C., the molten mass of glass has an enormous thermal inertia, and glass containers are rejected because of flaws if they are not drawn from a glass mass at the right temperature.

This all leads to huge uncontrolled energy consumption and great losses "a posteriori" in rejected containers.

The applicant has investigated the origin of the problems described above and considers that they are caused by the real temperatures of the glass mass in liquid form being unknown and that this is due to the fact that the current arrangement of the temperature gauges on the periphery of the liquid mass is basically inadequate.

It is considered that with these current arrangements no account is taken of the uncontrollable fluctuations in temperature inside the mass, the internal convention of the liquid glass mass, nor the variations in temperature in a synchronous disconnexion in the same liquid mass.

It is also considered that the gauges used are not the right ones and fundamentally, as mentioned above, that the location of the temperature gauges is absolutely inadequate.

The temperature gauges should be immersed in the liquid glass in the area that provides the best information regarding temperatures and detects the fluctuations in temperature in the mass as fast as possible.

This area has been discovered by the applicant.

For this reason, the glass melting furnace in this invention is of the type that have a melting chamber with an outlet holding the liquid glass mass, and at least one flue gas recuperative chamber, means for supplying the influx of fuel, and featuring at least one temperature gauge for measuring mass immersed in the liquid glass mass and placed approximately:

a) at a height with respect to the bottom of the melting chamber of $\frac{1}{3}$ to $\frac{1}{5}$ of the height of the level of the liquid glass mass, $$\frac{1}{5} h \leq h_2 \leq \frac{1}{3} h, \text{ and}$$

b) on the longitudinal axis of the melting chamber at a distance with respect to the wall of the chamber opposite the outlet of between 0.6 and 0.85 of the length (l) of the melting chamber $$0.6 \, l \leq l_1 \leq 0.85 \, l$$

It also features a means of calculating the derivative of the temperature in the liquid mass and the derivative of the temperature in the gases with regard to time based on the data provided by the mass temperature gauge(s) and the gas temperature gauge.

In order to gain a better understanding of the current invention, diagrams are provided illustrating the best way to do this in practice, which are susceptible to additional modifications without affecting its fundamental basics.

FIG. 1 shows a schematic front view of the glass melting furnace with the temperature gauges currently in existence and that proposed in this invention.

FIG. 2 shows a schematic, partial plan view of FIG. 1.

An example will now be provided of the practical and non-restrictive use of this invention.

It is assumed that the furnace is installed with the corresponding monitoring devices for burdens such as silica, carbonates, lime or boron components, etc, for instance, by means of a level gauge (1) in the tap hole (2) of the liquid glass (3), which gives the corresponding orders to the bath hoppers of these burdens.

The furnace itself is conventional with its melting chamber (4) and flue gas recuperative chamber(s) (5) arranged so as to recover heat along with a corresponding saving in energy.

It is absolutely vital in a glass furnace that the temperature is controlled for the gases (g) and liquid glass (3).

Conventional furnaces have come with gas temperature gauges (6) located in the upper part of the melting chamber (4) and several pairs of temperature gauges ($a_2$) for mass located at the bottom. In each pair of mass gauges, one of the gauges ($a_1$) is the main one and after passing the refractory (7), protrudes very slightly above the liquid glass (3) to a height ($h_1$) of 2 or 3 cm.

Contact with the liquid glass (3) deteriorates the lower protruding gauge ($a_1$) in three years, and in order for the furnace to go on working, there was another mass gauge ($a_2$) that replaces it and functions in its place. This second gauge ($a_2$) does not penetrate the molten glass (3) and thus it is not as useful as the gauge it replaces ($a_1$).

This method of measuring the temperature of the liquid glass has been shown to be inadequate in practice.

The applicant considers that the right gauges are not being used, nor are they being situated in the proper place, possibly because no account has been made up til now when this patent is being applied for, of some of the features of the molten glass mass in the melting chamber (4). We shall now examine three of these features:

1).—on the surface of the refractory, the temperature is usually about 1,300° C. and on the surface (S2) of the liquid glass it is usually around 1,459° C., each with substantial variations and great inertia.

2).—inside the mass of molten glass convection currents (C) are produced which, given the great viscosity—normally over 100 poises—of the liquid glass, produce speeds of virtually nothing in its contact with the refractory (7) and clearly noticeable inside the molten mass.

3).—given the great inertia of the mass of the liquid glass, its possible fluctuations are transmitted very slowly, being detected very late and only in part by the lower gauge ($a_1$).

All of these considerations indicate that the dissatisfaction of glass manufacturers for the late and inadequate perception of what is happening in the glass mass is due, at least in part, to the mass temperature gauges ($a_1$), ($a_2$).

The applicant has considered the previous features and has managed to ascertain the optimum area for placing the corresponding mass temperature gauge ($b_1$) in the mass of liquid glass, so that the user of the furnace can find out quickly and in the proper fashion what is happening inside.

The coordinates are approximately as follows:

OZ axis: the mass temperature gauge ($b_1$) should be immersed deep down inside the liquid mass to a height ($h_2$) with respect to the bottom of the refractory ($S_1$) of $\frac{1}{3}$ to $\frac{1}{5}$ of the height (h) of the level of the liquid mass $\frac{1}{5} \leq h_2 \leq \frac{1}{3} h$, preferably being $h_2 \cong \frac{1}{4} h$.

OY axis: Y=0

OX axis: the temperature gauge ($b_1$) should be placed along the OX axis (FIG. 2) of symmetry (longitudinal) of the melting chamber (4) and outlet (8) towards the tap hole (2) as illustrated in the diagram and with respect to the wall (p) opposite the outlet (8) at a distance ($l_1$) of 0.6 to 0.85 of the length (l) of the melting chamber (4):

$$0.6\, l \leq l_1 \leq 0.85\, l$$

In principle and given its optimum location, a single mass temperature gauge ($b_1$) is sufficient for the molten mass.

In order to avoid the gauge ($b_1$) from deteriorating in such an aggressive medium, it should be placed inside a molybdenum casing (9).

As an additional safety precaution, the molybdenum casing may house several gauges ($b_1$), ($b_2$), ($b_3$) so that the group will continue working despite the deterioration of the first one ($b_1$), which can be removed easily.

The other gauges ($b_2$), ($b_3$) can be treated in the same way as the first gauge ($b_1$), as described above.

The invention has been designed in such a way as to place two molybdenum casings in a series (one behind the other) each with its corresponding gauge in such a way that if the one immersed in the molten mass deteriorates, the other casing will push it completely inside the mass and take its place.

It is also important to know the temperature of the gases (g) produced by combustion in the melting chamber (4).

In order to avoid interferences of heat radiation from the walls of the melting chamber (4), convection effects and so on, the gauge for measuring the temperature of the gases (g) or fumes should preferably be placed in a receptacle (r) set up outside the flue gas recuperative chamber (5), for instance, on the walls of its refractory. A gauge (10) should be placed in each existing chamber (5).

Monitoring

The temperature ($\theta_1$) in the liquid mass of glass varies with the time (t): $\theta_1 = f(t)$ with its corresponding derivative ($\theta'_1$) being obtained from the data provided by the mass temperature gauge ($b_1$).

The temperature ($\theta_2$) in the gases (g) varies with the time (t): $\theta_2 = f(t)$, with its corresponding derivative ($\theta'_2$) being obtained from the data provided by the gas temperature gauge ($b_2$).

The corresponding software should be available programmed with a decision algorithm for regulating the influx of fuel into the melting chamber (4).

At each moment, with the corresponding inertia and safety thresholds, the algorithm determines that:

| $\theta'_1$ | $\theta'_2$ | ORDER | SPEED OF CARRYING OUT ORDER |
|---|---|---|---|
| + positive | + | ▽ reduce fuel | slowly |
| = | = | | |
| − negative | − | △ increase fuel | quickly |
| = | = | | |
| + positive | − | alarm, furnace working at abnormal rate | fast |
| − | + | | |

In such a way that:
1. If the derivative ($\theta'_2$) of the temperature of the gases and the derivative ($\theta'_3$) of the temperature of the liquid mass increase or do not change, the influx of fuel is slowly decreased.
2. If one of the derivatives ($\theta'_1$) ($\theta'_2$) decreases and the other fails to increase, the influx of fuel is rapidly increased.
3. If one of the derivatives increases and the other decreases, the alarm is set off for rapid intervention.

The following considerations should be taken into account:

A temperature is considered to be "constant" if its fluctuations are below 1.5° C. and its period of fluctuation is less than 10 minutes.

The furnace is accepted as stable if the temperatures of the mass gauge ($\theta_1$) and the gas gauge ($\theta_2$) remain constant.

Once an anomaly has been corrected by the system, the furnace adopts a steady rate for a certain period of time. The new values ($\theta_1$) and ($\theta_2$) of this new stable period (period of stability) are retained as a reference for the future.

The diagrams are schematic and explicative, so that the comparative dimensions of the elements are not real, for instance, the size of the mass gauge ($b_1$) or its casing (9) are smaller than as shown in the diagrams.

What is claimed is:

1. Glass melting furnace of the type consisting of a melting chamber, inside which is found the liquid glass mass, with an outlet, and at least one flue gas recuperative chamber, means for supplying the influx of fuel, featuring at least one mass temperature gauge immersed in the liquid glass mass and placed approximately:

a) at a height ($h_2$) with respect to the bottom of the melting chamber of ⅓ to ⅕ of the height (h) of the level of the liquid glass mass, $$\tfrac{1}{5} h \leq h_2 \leq \tfrac{1}{3} h \text{ and}$$

b) on the longitudinal axis of the melting chamber at a distance ($l_1$) with respect to the wall of the chamber opposite the outlet, of between 0.6 and 0.85 of the length of the melting chamber $$0.6\, l \leq l_1 \leq 0.85\, l.$$

2. Glass melting furnace, according to the previous claim, featuring a mass temperature gauge housed inside a molybdenum casing.

3. Glass melting furnace, according to the previous claims, featuring molybdenum casing housing several mass temperature gauges.

4. Glass melting furnace, according to the first claim, featuring a receptacle containing a gas temperature gauge connecting with each flue gas recuperative chamber.

5. Glass melting furnace, according to the previous claim 1, featuring a means of calculating the derivative of the temperature inside the liquid mass ($\theta'_1$) and the derivative of the temperature inside the gases ($\theta'_2$) based on the data furnished by the temperature gauge(s) for mass and for gases, with respect to the time, with the decision of how best to supply the fuel being based on these derivatives ($\theta'_1$), ($\theta'_2$).

6. Glass melting furnace, according to the fifth claim, featuring a decision based on these derivatives ($\theta'_1$), ($\theta'_2$), which is based on an algorithm, in such a way that:

a) if the derivative ($\theta'_2$) of the temperature of the gases and the derivative ($\theta'_1$) of the temperature of the liquid mass increase or do not change, the influx of the fuel is slowly decreased.

b) if one of the derivatives ($\theta'_1$) ($\theta'_2$) decreases and the other fails to increase, the influx of fuel is rapidly increased.

c) if one of the derivatives increases and the other decreases, the alarm is set off for rapid intervention.

* * * * *